Patented Sept. 18, 1945

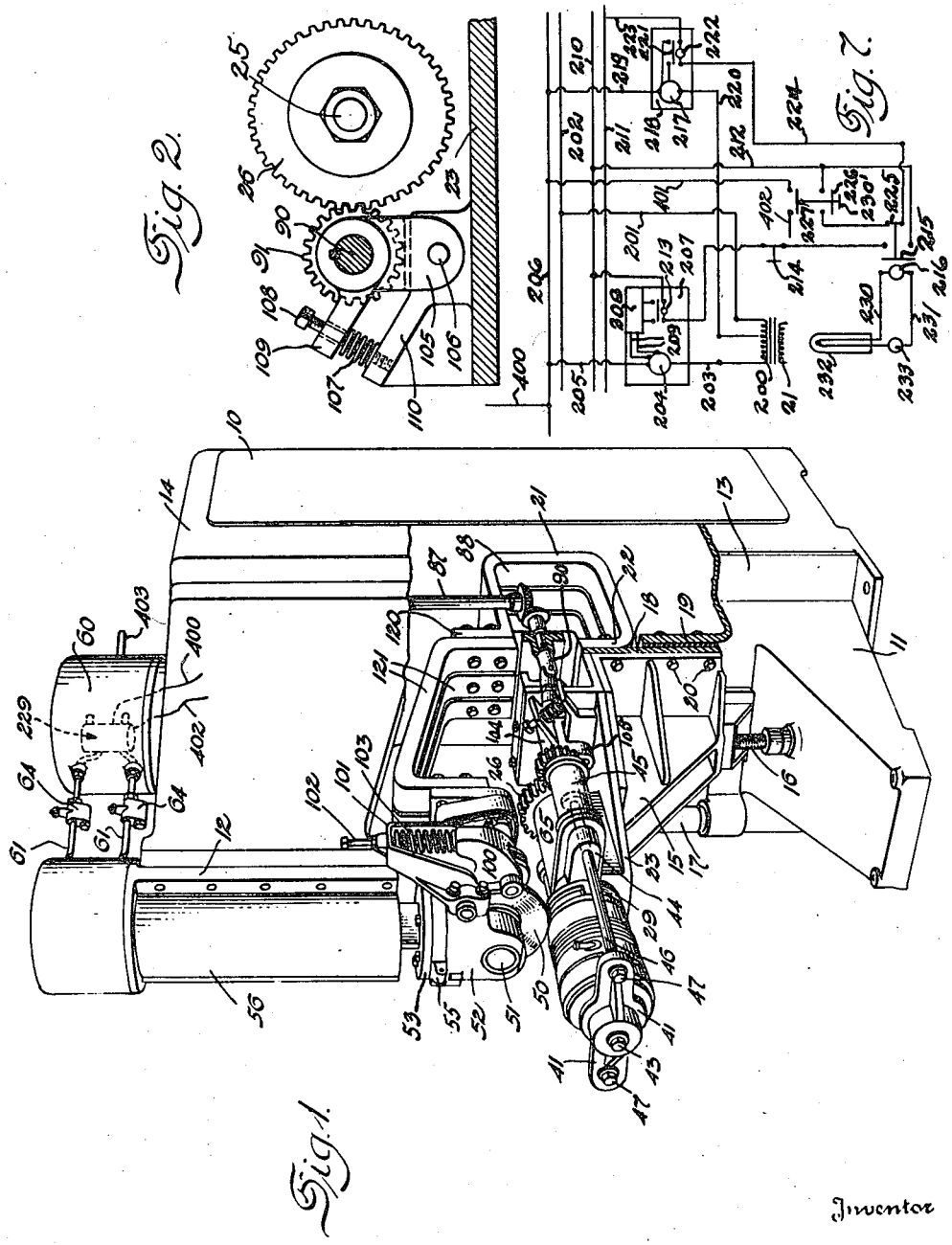

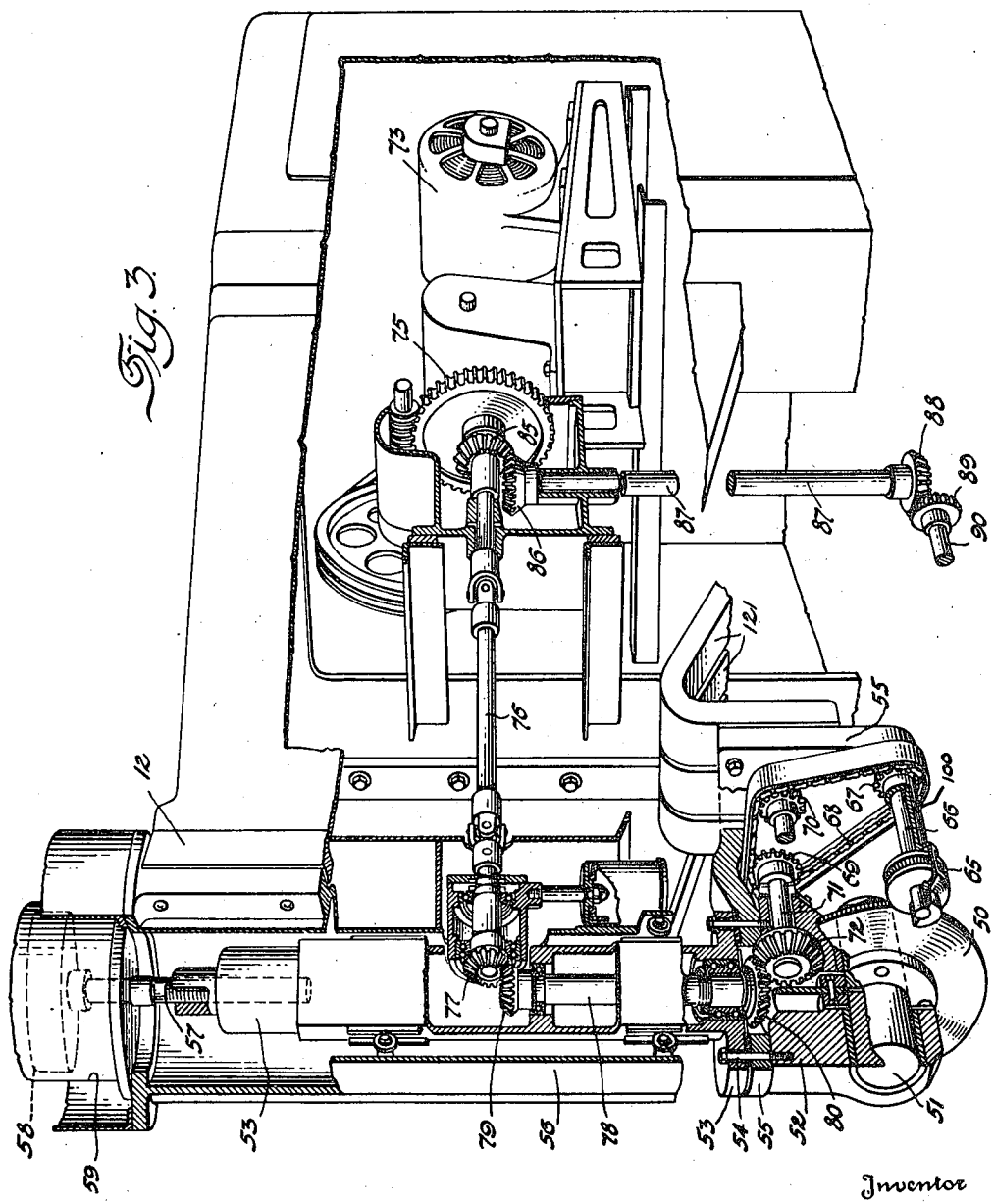

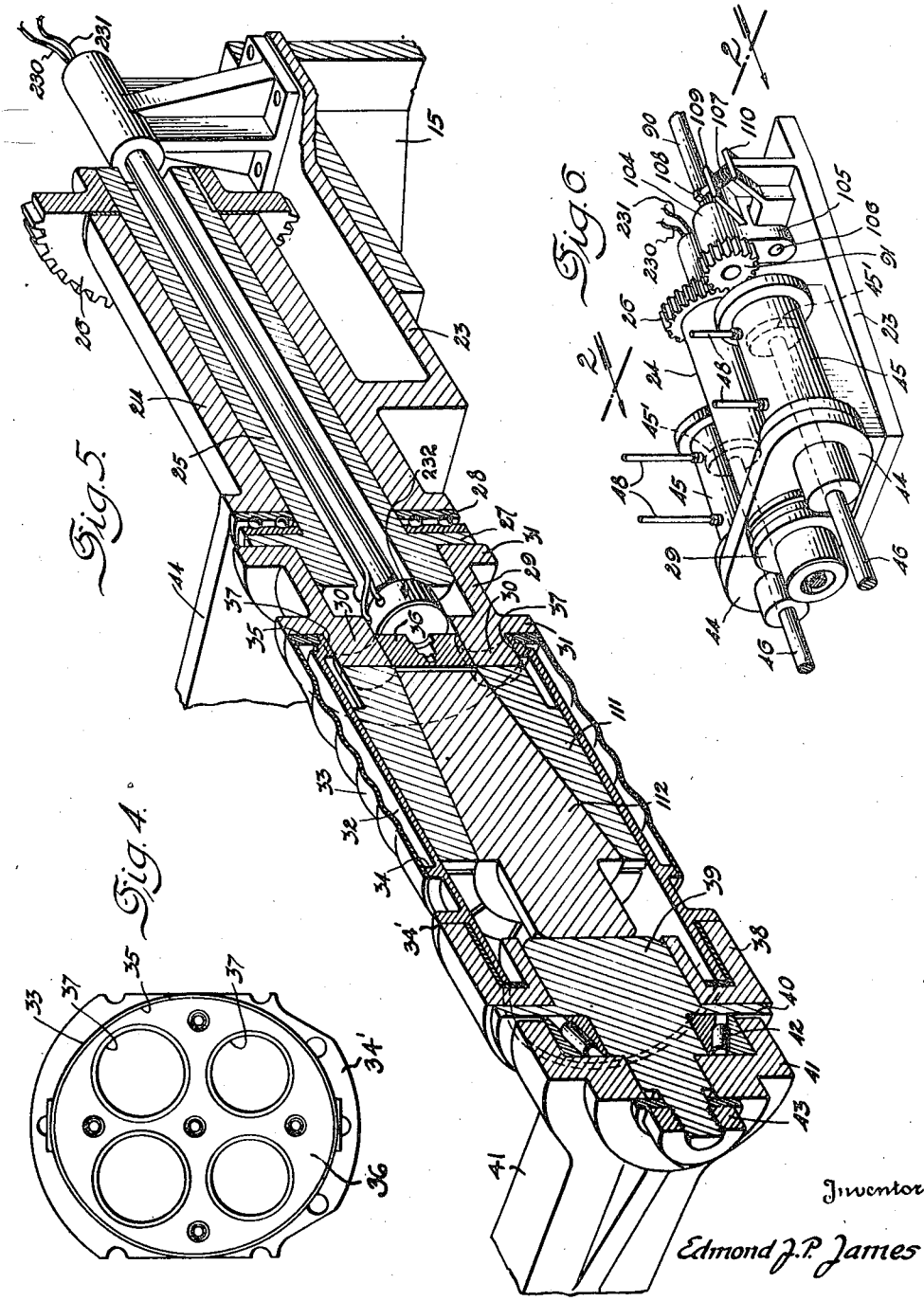

2,384,923

UNITED STATES PATENT OFFICE 2,384,923

RESISTANCE WELDING MACHINE

Edmond J. P. James, Akron, Ohio, assignor to Packard Motor Car Company, Detroit, Mich., a corporation of Michigan Application July 15, 1942, Serial No. 450,951

6 Claims. (Cl. 219—4)

This invention relates to welding machines and more particularly to resistance welding machines.

An object of the invention is to provide a system for controlling the temperature of metal work pieces for a welding operation to prevent stressing.

Another object of the invention is to provide a machine for resistance seam or chain welding work pieces by means of rotated electrodes in which provision is made for creating a predetermined temperature of the work pieces prior to and after the welding operation so that the work pieces will be preheated and annealed to prevent temperature changes that would otherwise result in cracking of the metal when high carbon steel is used or when there is considerable critical temperature variance.

Other objects of the invention will appear from the following description taken in connection with the drawings, which form a part of this specification, in which:

Fig. 1 is a perspective view of a welding machine, partly broken away, incorporating the invention;

Fig. 2 is a sectional view taken on line 2—2 of Fig. 6.

Fig. 3 is a sectional perspective view of the upper portion of the machine showing the roller electrode and the electrode driving mechanism.

Fig. 4 is a plan view of an engine cylinder structure welded together by the machine shown in Fig. 1;

Fig. 5 is a sectional perspective view of the driven electrode having the work pieces applied thereto and showing the thermocouple for the driven electrode;

Fig. 6 is a perspective view of the driven electrode, cylinder and holding mechanism.

Fig. 7 is a schematic diagram of the control.

Referring to the drawings by characters of reference, the welding machine frame 10 includes a base 11, a head 12, a front standard 13 joining the base and the head, and a hear housing 14. A platform 15 is supported on pedestal 16 and journaled on post 17 fixed to the machine frame. The front standard has an opening across the lower portion and conductor plate 18 extends over the lower part of the opening for engagement by the rear wall of the platform. Insulation 19 can be arranged between plate 18 and the front standard and bolts 20 can be used to secure the platform and plate to the standard. A transformer secondary 21 is arranged in housing 14 at the rear of the opening in the front standard and has a leg 22 attached to the rear face of plate 18.

A driven work holding electrode structure is supported on platform 15. A supporting carrier 23 having a journal bearing 24 is suitably secured on the platform, see Fig. 5, and through the bearing extends a sleeve shaft 25 on the end of which is splined a gear 26. On the forward projecting end of the shaft is a radial flange 27 and a thrust bearing 28 is arranged between this flange and the forward end of bearing 24.

The welding machine is designed to join a pair of sleeve-like work pieces which can be an engine cylinder barrel 32 and a sheet metal water jacket 33. The peripheral surfaces to be joined are shown out-of-round and are elliptical in form. The cylinder has radially projecting flanges 34 and 35 having elliptical peripheries similar to and over which the preformed elliptical jacket can be telescoped by endwise application. Flange 35 is part of a head wall 36 having fuel inlet and exhaust outlet ports 37 extending therethrough. It is proposed to form the barrel and head as castings or forgings that are welded together prior to application of the jacket, and the jacket can be formed of high carbon steel, such as stainless steel. The abutting surfaces of the flanges and the jacket are welded together circularly to seal a water space between the flanges. The work pieces are joined by seam or chain welding of the resistance type in which current passes through the work pieces and the electrodes during pressure application.

The forward end of shaft 25 is arranged to provide a pilot for adapter 29 and has bosses 30 arranged to extend into the inlet and outlet valve openings 37 in the cylinder barrel head wall. The adapter also has radial flanges 31, one of which is coextensive with the barrel head flange and the other of which lies adjacent flange 27 when mounted on the shaft pilot. The cylinder barrel is supported at its skirt end by adapter means including a sleeve member 38 and a core member 39. The sleeve member has a bearing on the core member and abuts barrel flange 34' at one end and a radial flange 40 on the core member at the other end. The core member projects through an opening in a carrier bar 41 and is supported therein by bearing 42. The end of the core projecting through the supporting bar is threaded and nut 43 is screwed thereon to hold the core in position with the bar.

Carrier arms 44 extend in opposite directions from journal bearing 24 and are parallel with the carrier bar. Cylinders 45 are fixed to arms 44 and contain pistons 45' to which rods 46 are connected. These rods extend through arms 44 and the carrier bar and retaining nuts 47 are screwed on the ends thereof. The pistons are actuated by power means, such as fluid pressure, and conduits 48 are connected with the cylinders for this purpose. The pistons and rods can be actuated to act on the carrier bar so that the adapter member 38 will press the barrel against the adjacent adapter flange 31 and in turn hold the adapter 29 in driven contact with flange 27 on shaft 25. The cylinder barrel will thus be rotated with shaft 25.

Cooperating with the carrier electrode structure for the work pieces is another roller electrode structure that serves to engage the outer work piece in line with the innermost of flanges 34 or 35, depending upon which end of the barrel is in advance when the barrel is applied to the carrier electrode structure. The roller electrode structure includes a peripherally knurled roller 50 mounted on a sectional shaft 51 supported by a bearing head member 52. The electrode structure is fixed to a carrier structure 53 by bolts 54 and a current conductor member 55 is secured by the bolts 54 to the bearing head member, suitable insulation being provided between the member 55 and the carrier structure 53. Current can flow through conductor 55, bearing head member 52, shaft 51 and roller 50.

The position of the roller relative to the jacket is determined by the carrier structure position which is controlled by fluid pressure. The carrier structure is suitably mounted on guide means 56 forming part of the machine frame head 12 and an actuator rod 57 is attached to the carrier. The rod is fixed to a piston 58 in cylinder 59 and a pressure system is connected with the cylinder to regulate the vertical position of the piston and roller electrode structure. This system includes a tank 60 into which air is moved through conduit 403 from a suitable pump (not shown). Air in the tank is maintained at uniform pressure and conduits 61 connect the tank with the ends of the cylinder. Pressure relief valves 64 are interposed in conduits 61 and suitable four-way solenoid controlled valve means 229, see Fig. 1, is employed to control air flow between the tank and the cylinder through either one of the conduits 61.

When air flows into the cylinder through upper conduit 61, the roller electrode will be engaged under predetermined pressure against the barrel jacket. As the out-of-round jacket makes a complete revolution, the roller electrode will be shifted vertically and, without pressure equalizing in the cylinder and supply means, pressure of the roller against the jacket would vary. With the relief valves and the supply tank, constant pressure of the roller against the jacket is maintained.

The knurled periphery of the roller electrode is engaged and driven by a knurled driving roller 65. This roller is driven by shaft 66 on which sprocket 67 is fixed. Chain 68, driven by sprocket 69, extends around idler sprocket 70 and sprocket 67. Sprocket 69 is fixed to shaft 71 driven by bevel gear 72. Shafts 66 and 71 and the journal for sprocket 70 are carried by suitable bearings formed as a part of or fixed to member 52. An electric motor 73 is suitably mounted in housing 14 and through suitable mechanism drives gear 75 fixed to jointed shaft 76 for driving bevel gear 77. Drive is transmitted from gear 77 to gear 72 by shaft 78 through means of gears 79 and 80, such shaft being mounted in bearings carried by the head bearing supporting structure slidable in guide means 56. Shaft 76 is formed of sections connected by universal joints so that it can flex with the vertical movement of the carrier.

Gear 26 for rotating the work pieces is driven from shaft 76 so that the rotation of the roller electrode will be synchronized with rotation of the carrier electrode on which the work pieces are mounted. Gear 85 is fixed on shaft 76 and meshes with gear 86 fixed on vertical shaft 87. Gear 88 fixed on shaft 87 drives gear 89 fixed on shaft 90 and gear 91 is fixed on shaft 90 and meshes with gear 26. Gear 26 corresponds in shape to the barrel jacket so that the surface speed of the elliptical jacket on which the roller electrode engages will be uniform during each revolution of the barrel. As the rotation of the electrodes is uniform and the timing of the intermittent applications of current is uniform, temperature will be regulated to produce efficient welding. This temperature control and uniform roller pressure will provide efficient welding unobtainable with either variable electrode pressure or variable timing periods relative to surface contact speed The driving roller shaft 66 can be carried by a hanger 100 pivotally supported on bracket 101 fixed to the bearing member 52 above the hanger, and a guide bolt 102 is fixed to the hanger and projects through the bracket. Spring 103 surrounds the guide bolt and urges the hanger in a direction to hold the wheel 65 in driving engagement with the roller electrode 50. This arrangement of the drive wheel with the roller electrode is provided to keep the knurled periphery of the electrode in the most desirable dressed condition.

As previously related, drive gear 26 is elliptical and rotates shaft 25 mounted in a fixed journal. Drive shaft 90 is flexible and has a supporting bearing 104, adjacent gear 91, formed with ears 105 that straddle a rib on carrier 23 and are pivotally connected thereto by pin 106. Gear 91 is held in mesh with gear 26 through flexible means in the form of a spring 107 surrounding guide bolt 108 and arranged between a flange 109 on the shaft supporting bearing and flange 110 on the carrier rib.

The carrier for the cylinder barrel and sleeve constitutes one electrode structure and roller 50, shaft 51 and head 52, the other electrode structure. There is an expansible arbor 111 and a tapered expander member 112 for the arbor that constitute part of the rotatable electrode structure. This arbor is in the form of an interiorly tapered sleeve that is slit for a portion of its length and receives the tapered expander. The sleeve arbor is designed to be inserted in the cylinder barrel so that it contacts therewith between flanges 34 and 35. The core member 39 will press the expander into the arbor and expand it into contact with the cylinder barrel when the piston rods 46 are operated to act on the bar 41 to seat and hold the barrel on the adapter 29 whereby they will be rotated by drive shaft 25. The arbor thus forms a part of the electrode for conducting heat to the barrel.

The transformer secondary 21 is fixed to conductor plate 18 that is in contact with carrier 23. This plate, cylinder barrel supporting structure and arbor are formed of suitable material to conduct current from the transformer to the cylinder barrel. The transformer has a free upper leg 120 that has angular conductor elements 121 secured thereto and to the conductor member 55. These conductor elements 121 are flexible to permit vertical movement of the attached electrode structure. The shaft 51 and supporting bearing member are formed of material such that current will flow from conductor elements 121 to the roller electrode.

The control for the welding system, heating system and fluid system for raising and lowering the roller electrode structure is shown schematically in Fig. 7. The transformer primary 200 is connected by conductor 201 with power line 202 and is connected by conductor 203 with a contactor power tube means 204, such tube means being connected by conductor 205 with power line 206. The power control tube means is of conventional design and controls the electrical welding circuit from the primary welding conductors, or power lines, to the transformers and is suitably mounted on control panel 207. A timer switch 208 is mounted on or adjacent the control panel and is connected with the power tube means by a pair of conductors 209. The electrical system also includes a pair of control lines or conductors 210 and 211. A conductor 212 leads from conductor 210 to relay 213 and includes a hand operated switch 214 and a solenoid switch 215. The relay 213 is connected to control timer switch 208 and switch 215 is arranged to be controlled by relay 216. Switches 214 and 215 are in series and both must be closed to complete the circuit to the timer switch which controls the operation of the power tube in the welding circuit. The apparatus for resistance welding previously described forms the subject matter of my divisional patent application Ser. No. 557,242 filed October 5, 1944.

Provision is made to preheat the cylinder barrel to a predetermined temperature prior to the welding operation and to continue such temperature for a period of time after the welding operation. A contactor power tube means of conventional design 217 is suitably mounted on a panel 218 and is connected with power line 206 by conductor 219. The tube is connected by a tap conductor 220 with the transformer primary 200 so that when the circuit is made, a limited current flows through the transformers and electrodes to heat the cylinder barrel when the electrodes are in welding position. The tube means controlling the preheat circuit is under the control of a switch 221 actuated by relay 222 which is connected with conductor 211 by conductor 223. A conductor 224 connects the relay 222 with conductors 212 and 210 and switches 225 and 226 arranged in series. Switch 225 is connected to operate with switch 215 in response to relay 216 and switch 226 is arranged to be operated manually. In order to establish the heating circuit, it is necessary that switches 225 and 226 both are closed.

For sake of convenience, a switch 227 controls the circuit to solenoid valve 229 that regulates air flow to the cylinder for raising and lowering the roller electrode and is connected to be operated by the same treadle 230' that operates switch 226. Switches 226 and 227 are normally open and are closed by the treadle, the arrangement being such that switch 227 will be closed upon light depression of the treadle and will remain closed while the treadle is further depressed to close switch 226. In this manner the fluid pressure will bring the welding roller into welding pressure engagement with the cylinder jacket prior to and while switch 226 is closed.

Relay 216 is controlled by the temperature of the barrel so that the heating circuit switch 225 will be opened while the welding circuit switch 215 is closed. The relay is connected by conductors 230 and 231 with a thermocouple 232 arranged preferably within adapter 29 and in thermal contact with the end wall 36 of the cylinder barrel. Below a predetermined barrel temperature relay 216 causes switch 225 to be closed and switch 215 to be open and above such temperature switch 215 is closed and switch 225 is opened. A thermostat switch 233 can be arranged in conductor 231 to control the temperature at which the thermocouple is effective to open and close the switches.

The electrical control, in the relation shown in Fig. 7, is ineffective to lower the roller electrode, to heat the barrel or to perform a welding operation. After placing the barrel and jacket in proper relation to each other and on the carrier, the motor 73 can be started by a suitable switch (not shown) to cause rotation of the roller electrode. The switch 225 is closed and the treadle 230' is depressed sufficiently to close switch 227, but not switch 226. Solenoid valve 229 will be shifted down to admit air pressure to the top of piston 58 to thus lower the roller electrode into welding pressure engagement with the jacket. The treadle 227 is next further depressed to close switch 226 which energizes relay 222 to close switch 221 controlling the power tube between conductors 219 and 220 so that current will flow through a portion of the transformer primary and conductor 201. This circuit energizes the electrodes causing the cylinder barrel to heat up.

When the cylinder barrel reaches a predetermined temperature, that is, sufficiently preheated for the welding operation, the thermocouple influences relay 216 to cause switch 225 to open and switch 215 to close. Opening switch 225 will break the heating circuit, and closing switch 215 will establish the control circuit to the timer switch relay which will establish and control the welding circuit through the tube means 204 between conductors 203 and 205 so that current will flow through conductors 203, 201 and the transformer from the welding power lines. The timer switch is preferably of the character whereby a chain or stitch welding operation is provided.

When the cylinder barrel has made a complete revolution during the welding operation of the machine, switch 214 is opened to break the welding circuit even though the thermocouple retains the switch 215 closed. During the welding operation the treadle has been depressed to maintain switch 227 closed so that the roller electrode will remain pressed against the barrel jacket. If the treadle has been released sufficiently to open switch 226, it is again depressed to close switch 226 and when the barrel cools down to below the before-mentioned predetermined temperature, switch 225 will close and again establish the heating circuit which will continue to maintain the barrel heated until the treadle is released to open switch 226. Further release of the treadle will open switch 227 releasing solenoid valve 229 so that it will move upwardly allowing air flow to the underside of piston 58 and thereby raising the roller electrode from the barrel jacket. The welded barrel and jacket are now ready to be removed from the machine, and can be reversed endwise on the machine to weld the other end of the jacket to barrel flange 34 in a manner similar to that just described.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a machine having a pair of electrode means for resistance welding work pieces together, electric circuit means connected with the electrodes for heating the work pieces, electric circuit means for supplying welding current to said electrode means, a pair of switches in series in said welding circuit means, one of said switches being controlled manually and the other switch being normally open, a normally closed switch in the heating circuit, and means responsive to temperature rise in one of the work pieces for closing the normally open welding circuit switch and opening the normally closed heating circuit switch.

2. In a machine having a pair of electrode means for resistance welding work pieces together, means for heating the work pieces, electric circuit means for supplying welding current to said electrode means, a pair of switches in series in said circuit means, one of said switches being manually controlled and the other switch being normally open, a thermocouple contacting one of the work pieces, and relay means connected with the thermocouple and actuating said normally open switch to close the welding circuit when the work piece heating the thermocouple reaches a predetermined temperature.

3. In a machine having a pair of electrode means for resistance welding work pieces together, a circuit for supplying welding current to the electrodes including a transformer, a heating circuit means connected with the transformer for supplying current to the electrodes, a pair of switches in series in the heating circuit means, one of said switches being manually operated and the other switch being normally closed, and means including a thermocouple contacting a work piece responsive to temperature rise in one of the work pieces, after the manually operated switch is closed, for opening the normally closed switch.

4. In a machine having a pair of electrode means for resistance welding work pieces together, a controlled circuit for supplying welding current to the electrode means including a transformer, a heating circuit means connected with the transformer and connected to supply heating current to the work pieces through the electrode means, a pair of switches in series in said heating circuit means, one of said switches being manually controllable and the other switch normally closed, a thermocouple contacting one of the work pieces, and means including a relay connected with the thermocouple and actuating said normally closed switch to open the heating circuit when the thermocouple is heated by a predetermined temperature rise in the contacted work piece.

5. In a welding machine having a pair of electrode means for resistance welding work pieces together, an electric circuit for supplying welding current to the electrode means including transformer means, a normally open control switch in the welding circuit, an electric circuit connected with the transformer for supplying a heating current to the electrode means, a normally closed control switch in said heating circuit, and means including a thermocouple controlled by a predetermined temperature of one of the work pieces for shifting said switches to close the welding circuit and to open the heating circuit.

6. In a welding machine having a pair of electrode means for resistance welding work pieces together, an electric circuit for supplying welding current to the pair of electrode means, an electric circuit for supplying heating current to the pair of electrode means, a dual switch normally opening the welding circuit and closing the heating circuit, and means including a thermocouple responsive to a predetermined temperature rise in one of the work pieces for shifting the dual switch to close the welding circuit and open the heating circuit.

EDMOND J. P. JAMES.